(12) United States Patent
Marchildon et al.

(10) Patent No.: US 8,851,581 B2
(45) Date of Patent: Oct. 7, 2014

(54) INDEPENDENT SUSPENSION TRACTION SYSTEM FOR A VEHICLE

(75) Inventors: Louis-Frederic Marchildon, St-Charles de Drummond (CA); Marc-Andre Durocher, St-Georges de Windsor (CA); Martin Bellemare, Drummondville (CA)

(73) Assignee: Soucy International Inc., Drummondville (CA)

( * ) Notice: Subject to any disclaimer, the term of this patent is extended or adjusted under 35 U.S.C. 154(b) by 499 days.

(21) Appl. No.: 13/292,226

(22) Filed: Nov. 9, 2011

(65) Prior Publication Data
US 2012/0286565 A1 Nov. 15, 2012

Related U.S. Application Data

(60) Provisional application No. 61/411,532, filed on Nov. 9, 2010.

(51) Int. Cl.
*B62D 55/08* (2006.01)
*B62D 55/084* (2006.01)

(52) U.S. Cl.
CPC .................................. *B62D 55/084* (2013.01)
USPC ......................................................... 305/132

(58) Field of Classification Search
CPC ........ B62D 55/04; B62D 55/08; B62D 55/10; B62D 55/12; B62D 55/125; B62D 55/30; B62D 55/084
USPC ......... 305/124, 127, 128, 129, 130, 131, 132, 305/134, 135, 138, 142, 143, 150, 153, 60; 180/9.1, 9.21, 9.26
See application file for complete search history.

(56) References Cited

U.S. PATENT DOCUMENTS

| | | | | |
|---|---|---|---|---|
| 5,829,848 | A * | 11/1998 | Kelderman | 305/15 |
| 8,607,903 | B2 * | 12/2013 | Godin et al. | 180/9.1 |
| 2008/0258549 | A1 * | 10/2008 | Scheetz | 305/125 |
| 2010/0137084 | A1 * | 6/2010 | Mevissen et al. | 474/135 |

* cited by examiner

*Primary Examiner* — S. Joseph Morano
*Assistant Examiner* — Jean Charleston
(74) *Attorney, Agent, or Firm* — Brouillette & Partners; Robert Brouillette

(57) ABSTRACT

A track system for use as wheel replacement on typically wheeled vehicles, such as all-terrain vehicles (ATV) or farming equipments, having more than four wheels, is disclosed. The track system described provides independent suspension elements for at least two traction wheels.

12 Claims, 11 Drawing Sheets

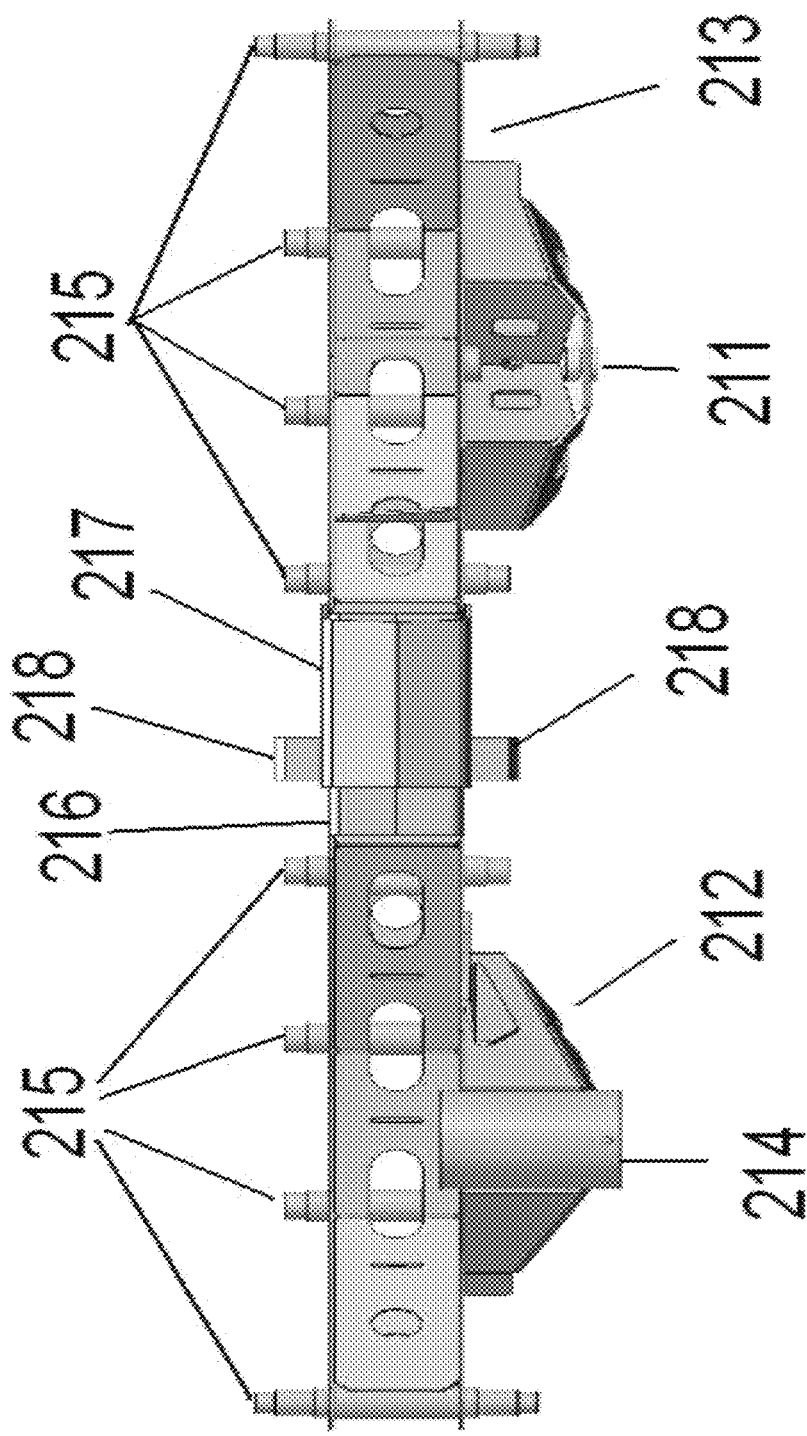

INDEPENDENT SUSPENSION TRACTION SYSTEM FOR A VEHICLE

CROSS-REFERENCE TO RELATED APPLICATIONS

The present patent application claims the benefits of priority of U.S. Provisional Patent Application No. 61/411,532, entitled "Independent Suspension Traction System for a Vehicle" and filed at the United States Patent and Trademark Office on Nov. 9, 2010, the content of which is incorporated herein by reference.

FIELD OF THE INVENTION

This invention generally refers to the field of traction assemblies and track systems used to replace one or more wheels on normally wheeled vehicles. The present invention more particularly relates to traction assemblies and track systems used to replace two or more wheels.

BACKGROUND OF THE INVENTION

Track systems for use as wheel replacement on typically wheeled vehicles are known in the art. Indeed, several configurations of track systems have been proposed throughout the years in order to generally improve different aspects and characteristics such as the riding behaviour. In addition, track systems have been used on different types of wheeled vehicles such, but not limited to, all-terrain vehicles (ATV), farming equipments such as tractors, snow grooming equipments, etc.

Though track systems generally improve several characteristics of the vehicles such as traction and floatation, particularly over soft terrain, it remains that track systems are typically retrofitted on existing vehicles which were initially designed to support wheels.

In that sense, the configuration of the vehicle which wheels are replaced by track systems is typically not adapted to readily receive such track systems. This is particularly true for vehicles having multiples axles such as 6 wheels ATVs.

Hence, despite ongoing developments in the field of track systems, there is still room for further improvements for track systems configured to be used on wheeled vehicles having at least 6 wheels. Generally, those vehicles have more than two traction wheels at the rear. As of today, some systems allow the installation of track system for four propulsion wheels. However, these prior art systems substantially or completely reduce the suspension elements efficiency, which, as a consequence, limits the propulsion potential on rough terrain as the track contact with the terrain is often inappropriate.

SUMMARY OF THE INVENTION

The principles of the present invention are generally embodied in an independent suspension track system allowing a vehicle having more than four wheels, such as an ATV or farming equipment, and at least two of its wheels replaced with a track system. The track system allows the independent displacement of the drive sprockets of the track system according to the movement of the suspension elements.

The independent suspension traction system of the present invention comprises a main frame, at least one typically fixed drive sprocket, at least one idler wheel pivotally mounted at each extremity of the main frame, a plurality of road wheels pivotally mounted to the main frame, at least one pivot, at least one mobile drive sprocket, at least one tension adjustment system and an endless traction band. The main frame typically, though not necessarily, comprises a plurality of sections, typically two. The frame sections are moveable with respect to each other. The tension adjustment system allows tension to be increased or decreased on the endless traction band typically by screwing or unscrewing a push bolt which pushes the sections of the frame in opposite directions.

In accordance with the principles of the invention, the pivot allows a lateral movement between the fixed drive sprocket and mobile drive sprocket and a vertical camber angle between each wheel for the back and forth movements of the suspension elements of the wheeled vehicle. The pivot is positioned on the main frame to ensure that the tension applied on the endless traction band stays uniform regardless of the lateral and vertical displacement of the traction system.

In accordance with the principles of the present invention, due to its particular configuration, the independent suspension traction system also generally maintains the contact patch of the traction band of the track system substantially parallel to the ground over which the vehicle is operated, and that, substantially independently of the position (e.g. extended, normal or retracted) of the suspension of the vehicle.

The independent suspension traction system of the present invention is particularly useful when used on all-terrain vehicles ("ATV"), such as the ones having two front wheels and four rear wheels.

The features of the present invention which are believed to be novel are set forth with particularity in the appended claims. Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 3C is a top view of the main frame and the related components.

DETAILED DESCRIPTION OF THE PRESENT EMBODIMENT

A novel traction system for vehicle having generally more than four wheels will be described hereinafter. Although the invention is described in terms of specific illustrative embodiments, it is to be understood that the embodiments described herein are by way of example only and that the scope of the invention is not intended to be limited thereby.

The present invention relates to an independent suspension traction system for a vehicle having generally more than four wheels and using an endless traction band and a plurality of wheels for propulsion.

Figure 1A:
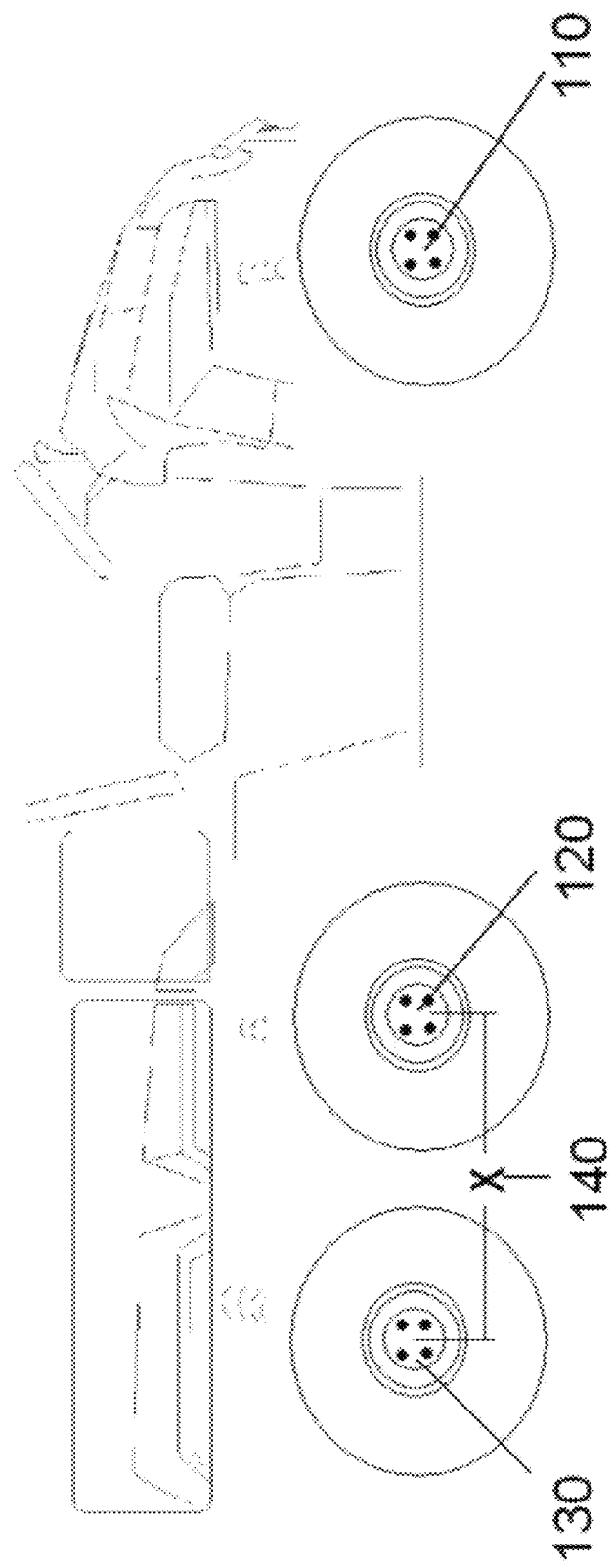
FIG. 1A is a side view of an all-terrain vehicle without an independent suspension traction track system and where the distance between the axes of the wheels is identified as X.

Referring first to FIG. 1A, for illustration purpose, a vehicle 100 having more than four wheels without an independent suspension traction system, typically an all-terrain vehicle ("ATV"), is presented. Specifically, the ATV 100 has six wheels, two wheels 110 located at the front, which are used to steer and/or to tract the ATV 100, and four wheels 120 and 130 located at the rear of the ATV for traction purposes. As shown in FIG. 1, a fixed distance ("X") 140 separates the axis of the wheel 130 from the axis of the wheel 120.

Figure 1B:
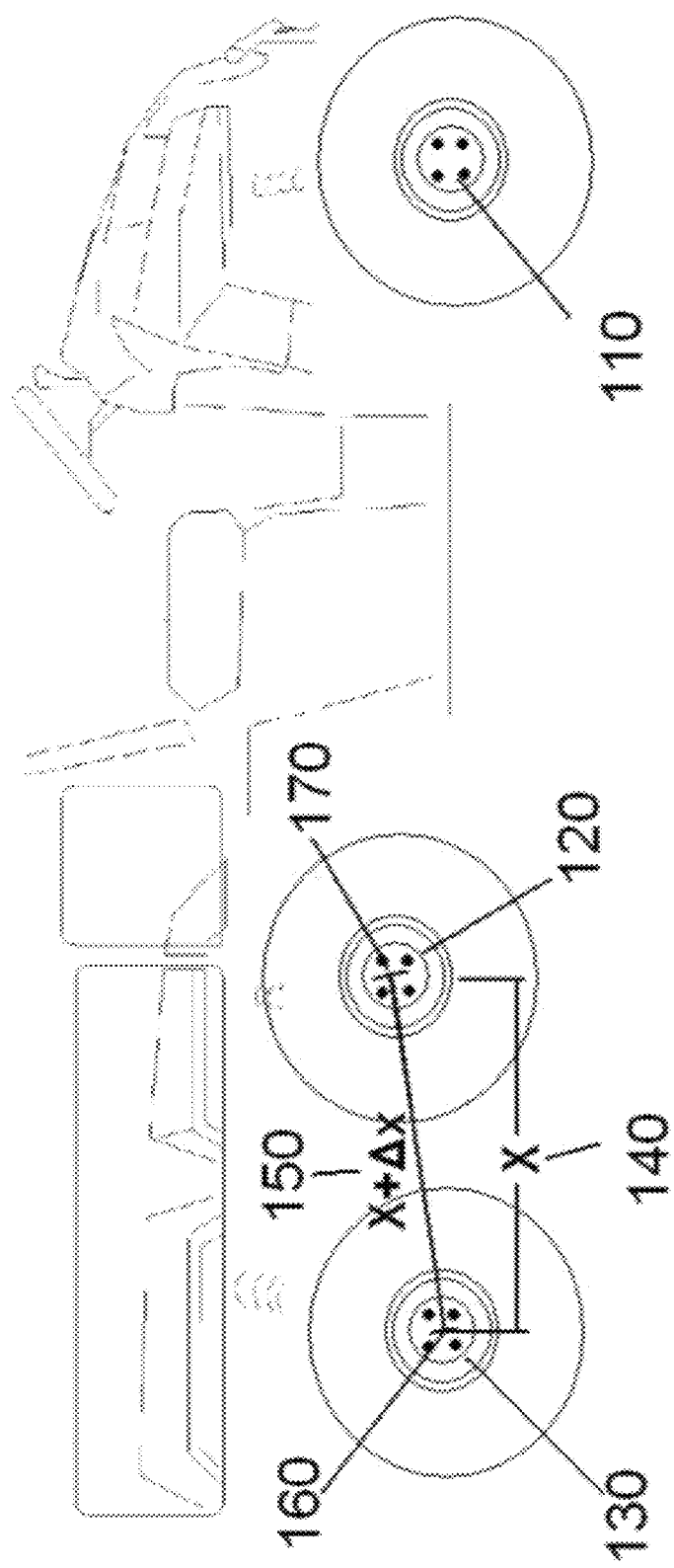
FIG. 1B is a side view of an all-terrain vehicle without an independent suspension traction system showing the variation of the distance between the axes of the wheels, when the suspensions have not travelled the same distances on each wheel.
Figure 1C:
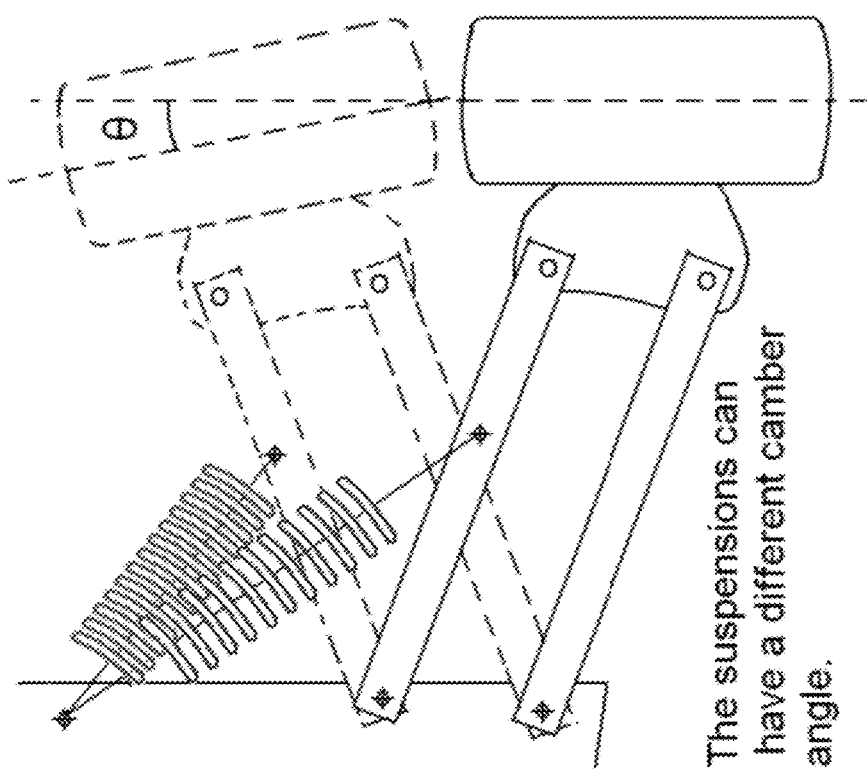
FIG. 1C is a rear view of the suspension elements showing in a compressed state (dotted line) and in a rest state (solid line) and showing a camber angle (θ) between the axis of the wheel and a vertical axis resulting from the suspension displacement.

Now referring to FIG. 1B, the rear wheels 120 and 130 of the vehicle 100 are shown while the vehicle 100 travels over uneven terrain. While the horizontal distance between the two axes of the wheels 120 and 130 remains X (140), the linear distance between each axis of the wheels 120 and 130 changes to X+Δx (150).

A traction system in accordance with the principles of the present invention takes into account such variation in the distance between the two wheels it replaces. A first embodiment of the independent suspension traction system 200 is shown in FIG. 2.

Figure 2:
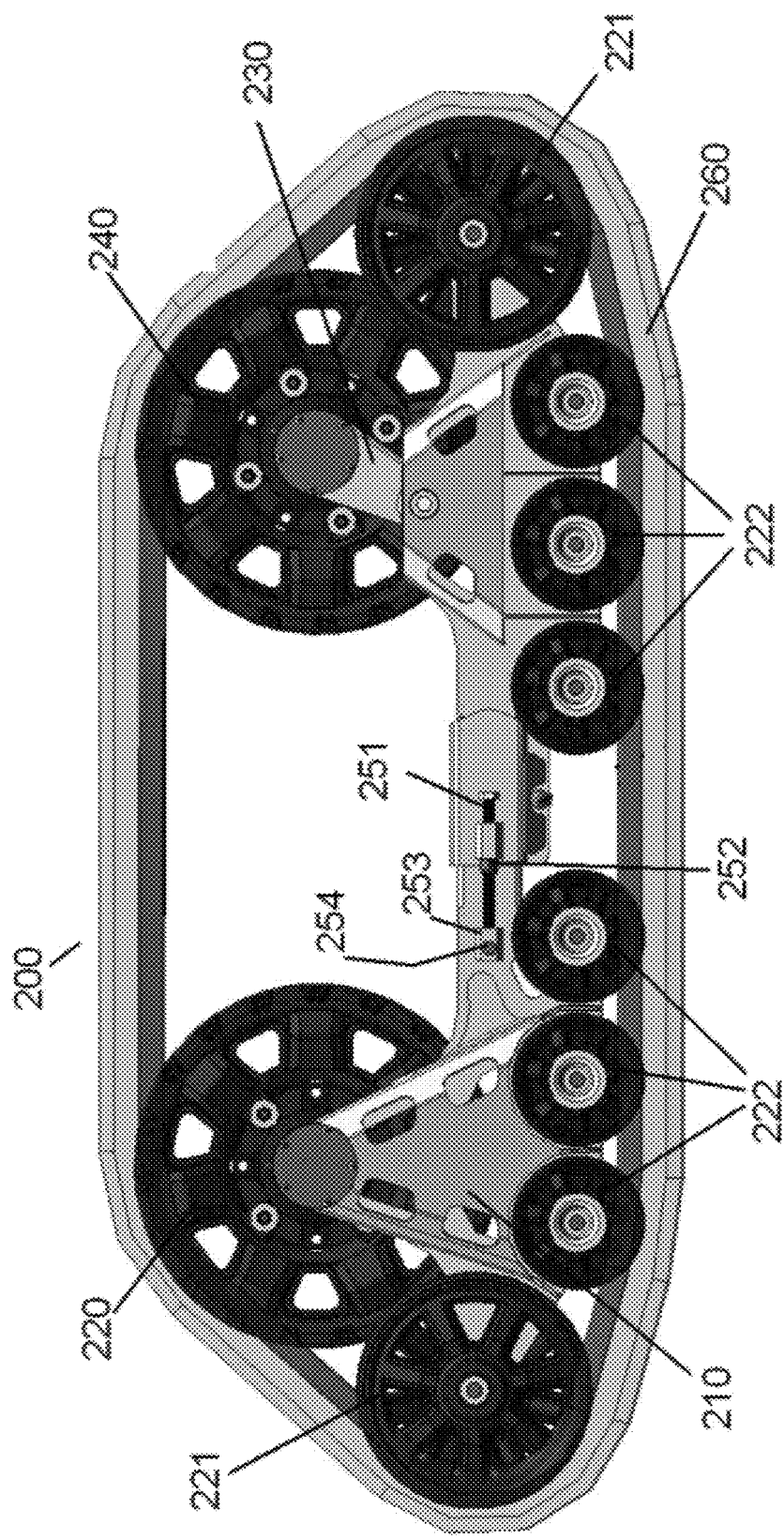
FIG. 2 is a side view of the complete independent suspension traction system.

Now referring to FIGS. 1A and 2, the present embodiment provides a replacement traction system for the two rear wheels 120 and 130 and enables the ATV 100 to travel on rough and uneven terrains.

Now referring to FIG. 2, the independent suspension traction system 200 comprises a main frame 210, at least one fixed drive wheel 220, at least one idler wheel 221 pivotally mounted at each extremity of the main frame 210, a plurality of road wheels 222 pivotally mounted to the main frame 210, at least one pivotal member 230 pivotally attached to the main frame 210, at least one mobile drive wheel 240, at least one tension adjustment system 250 and an endless traction band 260.

In the present embodiment, the at least one fixed drive wheel 220 and at least one mobile drive wheel 240 are sprocket wheels.

Each drive wheel 220 and 240 is attached to an axle shaft of the vehicle. In the present embodiment, all drive wheels are attached to a rear axle drive shaft.

Figure 3A:
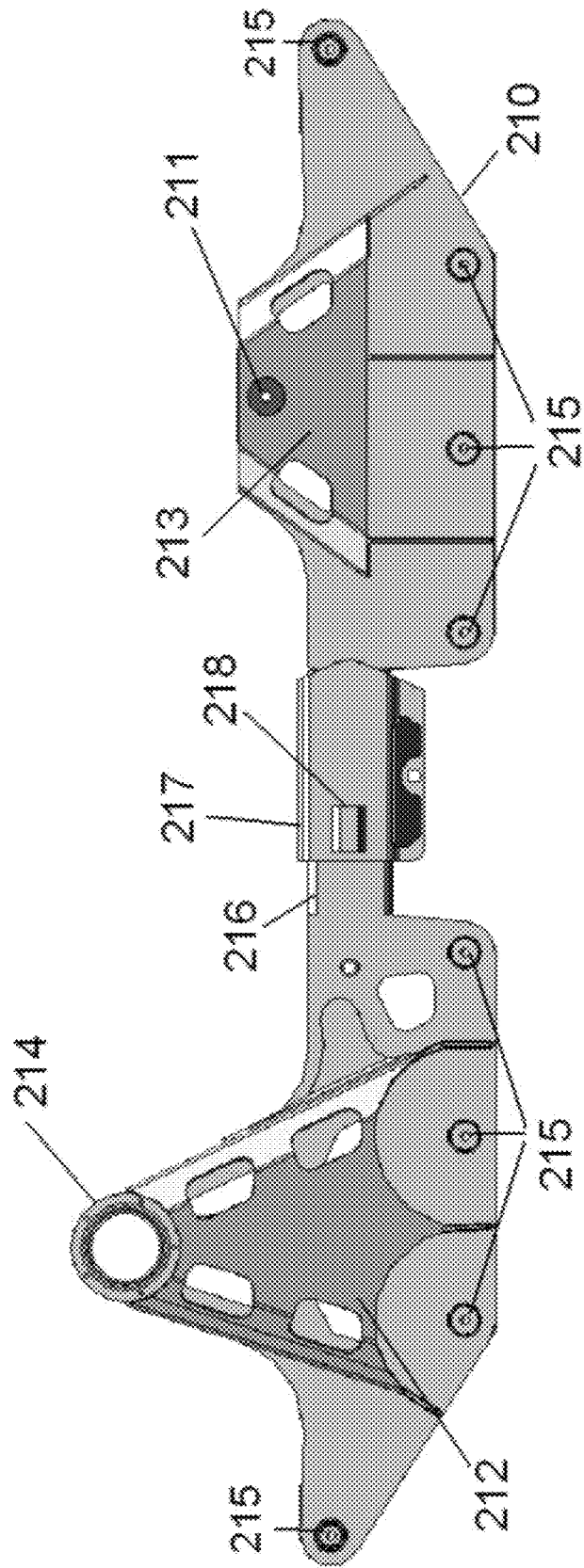
FIG. 3A is a side view of the main frame and the related components.
Figure 3B:
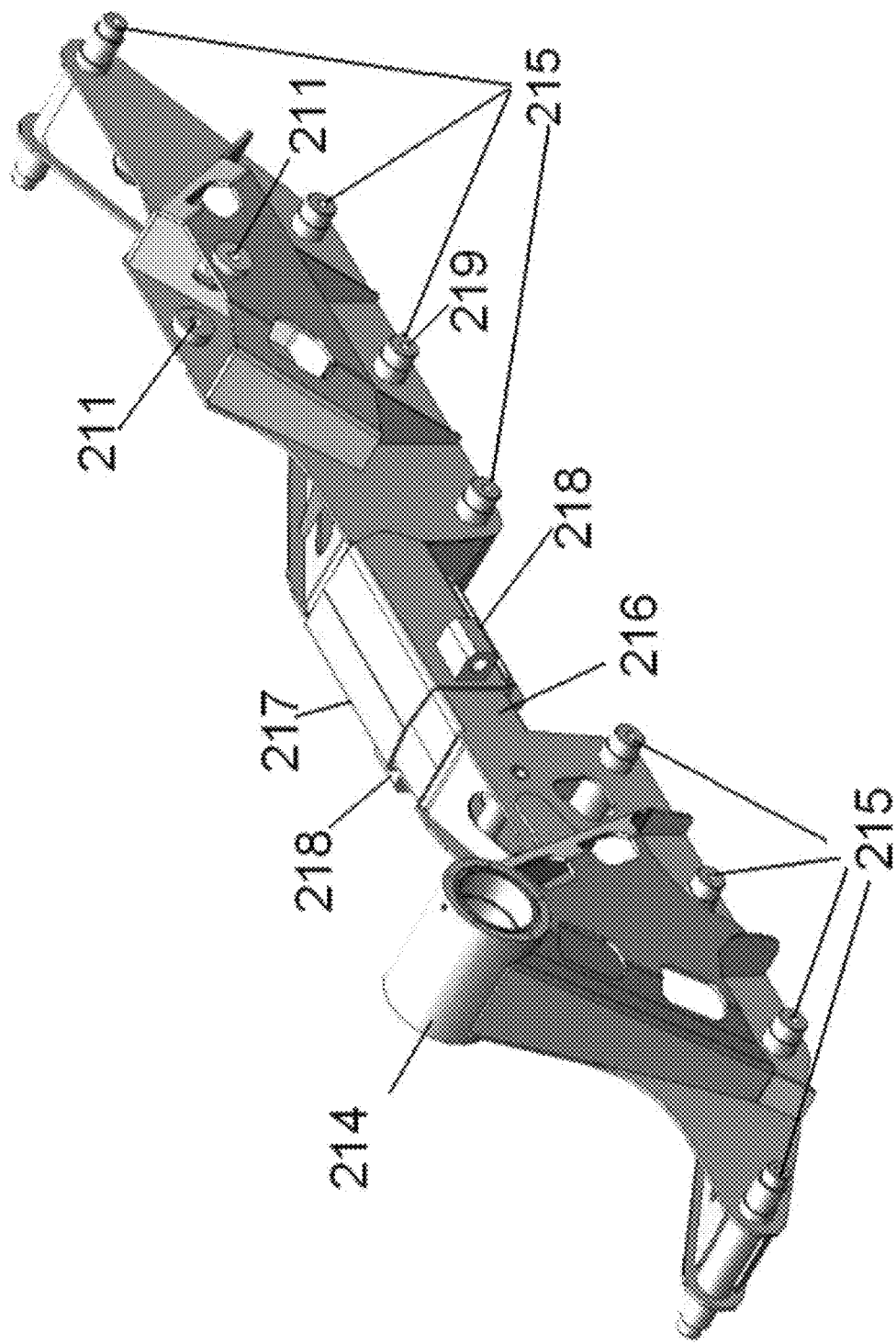
FIG. 3B is a perspective view of the main frame and the related components.

Now referring to FIG. 3A, FIG. 3B and FIG. 3C, in the present embodiment, the main frame 210 is typically made of rigid material, such as aluminum, steel or any appropriate plastic composite, and comprises a plurality of sections, typically two, namely sections 212 and 213. The sections 212 and 213 are moveable with respect to each other. A first frame section 212 comprises a plurality of generally circular apertures 214 in which a rolling mechanism, typically bearings, is installed and an extension 216, typically rectangular with rounded corner.

A second frame section 213, typically moveable with respect to the first frame section 212, comprises a plurality of generally rounded apertures 211 used to fix the pivotal member 230, a passage or cavity 217 and at least one enclosure 218 used to hold at least one tension retainer 251. The rounded apertures 211 are positioned on a section of the main frame 210 to ensure that the mobile drive sprocket 240 (shown on FIG. 2) applies a constant tension on the endless traction band 260 during the pivotal movement of the mobile drive sprocket 240 induced by the variation of the angle of the pivotal member 230 (shown on FIG. 2). The cavity 217 has a slidingly compatible shape with the extension 216 in order to allow the adjustment of the tension of the independent suspension traction system 200 through at least one push bolt mechanisms 251.

The main frame 210 comprises a plurality of laterally extending shafts 215 having apertures 219. The wheels 221 and 222 rotate around retainers fixed in the said apertures 219.

Figure 4A:
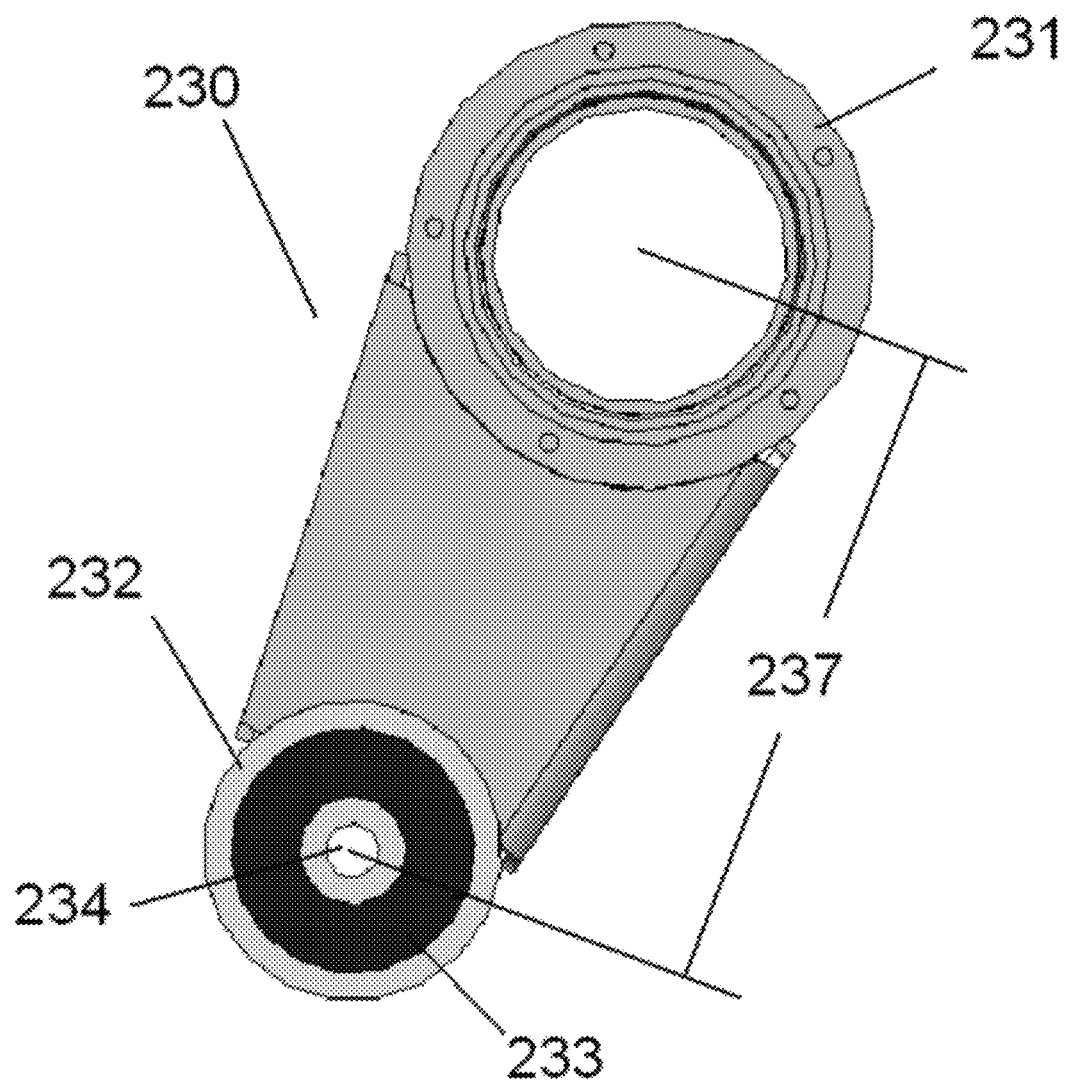
FIG. 4A is a close-up side view of the pivotal member.
Figure 4B:
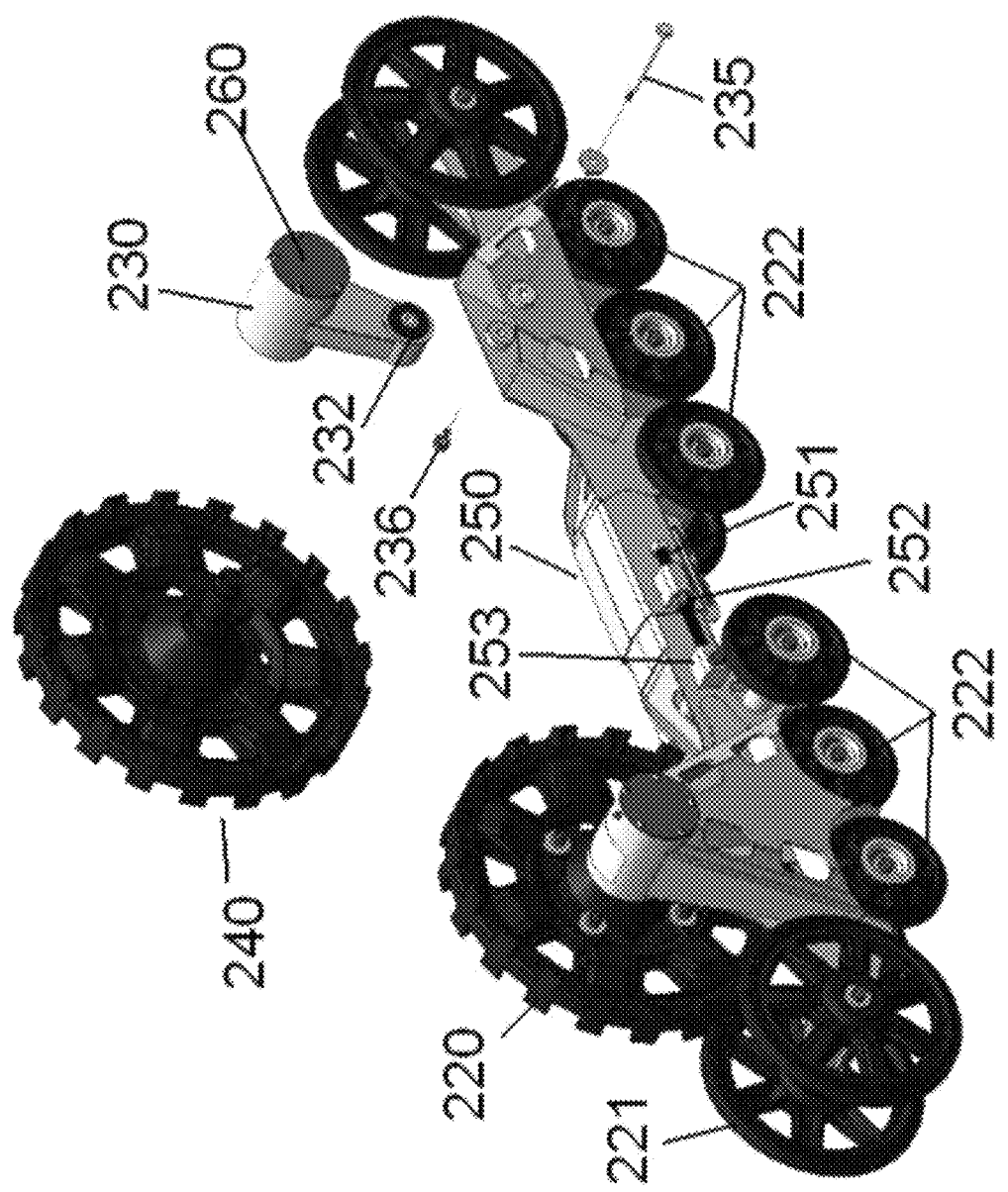
FIG. 4B is perspective view of the independent suspension traction system without the traction band and with the pivotal member being exploded.
Figure 5:
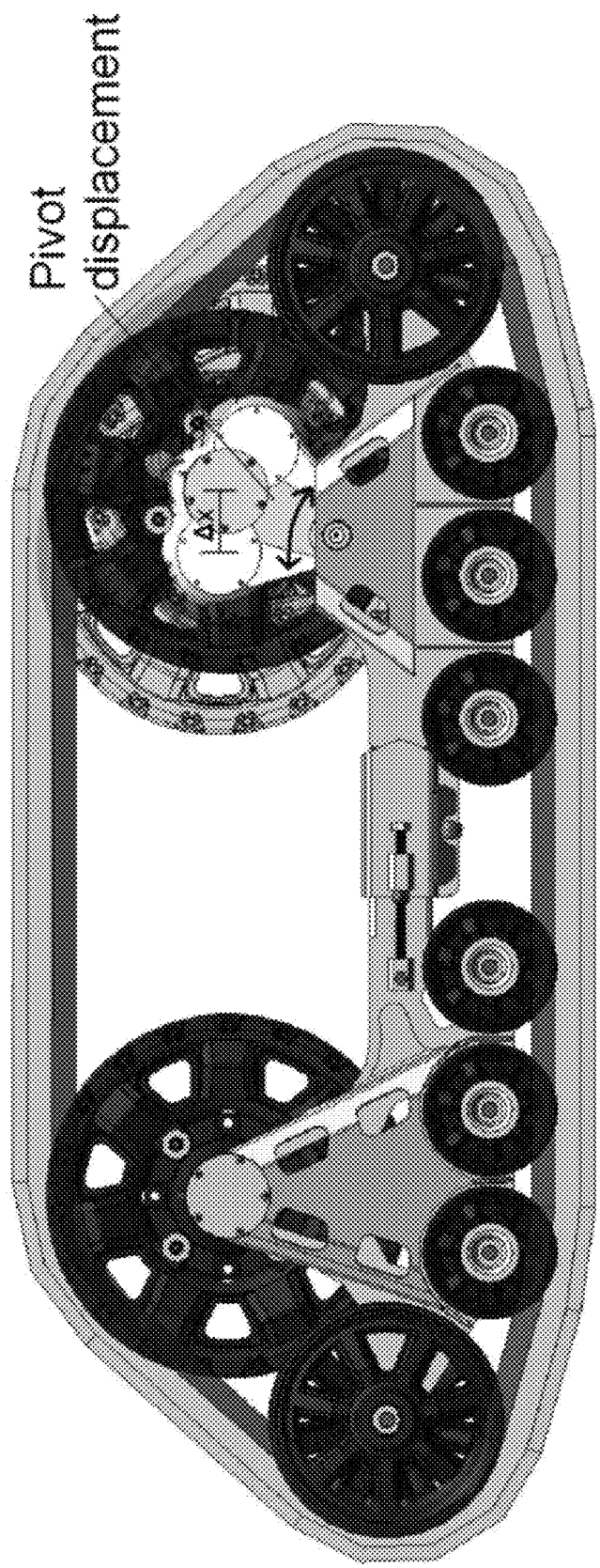
FIG. 5 is a side view of the independent suspension traction system where the suspension has traveled a distance identified as Δx.

Now referring to FIG. 4A and FIG. 4B, the pivotal member 230 provides lateral movement between the fixed drive sprockets 220 and the moveable drive sprockets 240 and allows the pivoting of the moveable drive sprockets 240 around of a shaft 235. The pivotal member comprises an aperture 231, typically having a cylindrical shape, that retains a rolling mechanism 260, such as bearings, allowing the sprocket wheel 240 to rotate, and a ball joint 232 or any structure that could provides lateral and pivotal movement. The ball joint 232 has a typically cylindrical passage and comprises an elastomeric bushing 233 allowing the pivot member 230 to rotate around a shaft 235 slidingly fit in an aperture 234 as shown on FIG. 5 and to move laterally in the axis of the shaft 235 as shown on FIG. 6A.

The length 237 between the centre of the aperture 231 and of the centre of the aperture 234 is relative to the diameter of the mobile drive sprocket 220 and to the position of the apertures 211 on the main frame 210 in order to ensure that the tension applied on the endless traction band 260 is substantially constant. The initial angle between the pivot member 230 and the main frame 210 is calculated to ensure that the tension from the endless traction band 260 is advantageously applied on the main frame 210 compare to the tension applied to the suspension elements of the ATV.

Now referring to FIG. 4B, the shaft 235 is slid through the aperture 211 and secured by a fastener 236.

Now referring back to FIG. 2, the tension adjustment system comprises at least one push bolt 251, at least one nut 252 and at least one bolt stopper 253. By screwing or unscrewing the nut 252, the second frame section 213 slides away or toward the first frame section 212, causing the tension in the endless track 260 to be increased or decreased.

Figure 6A:
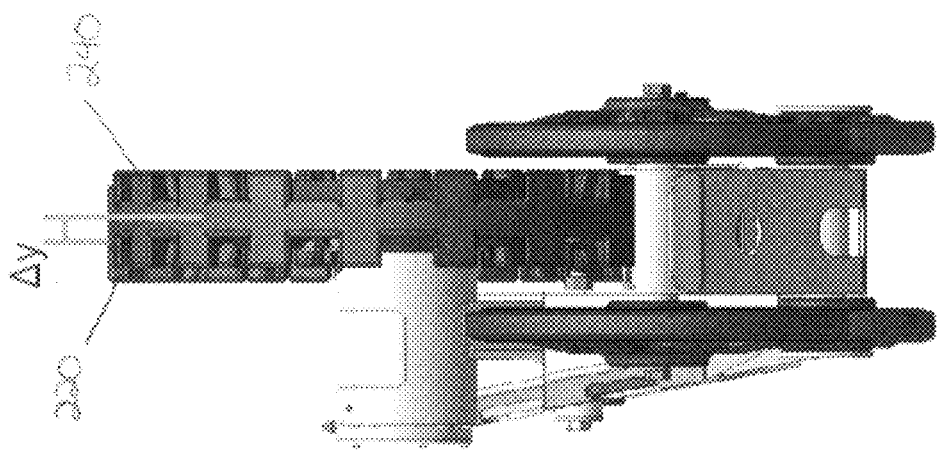
FIG. 6A is a rear view of a complete assembly showing a different camber angle (θ) of each sprocket.
Figure 6B:
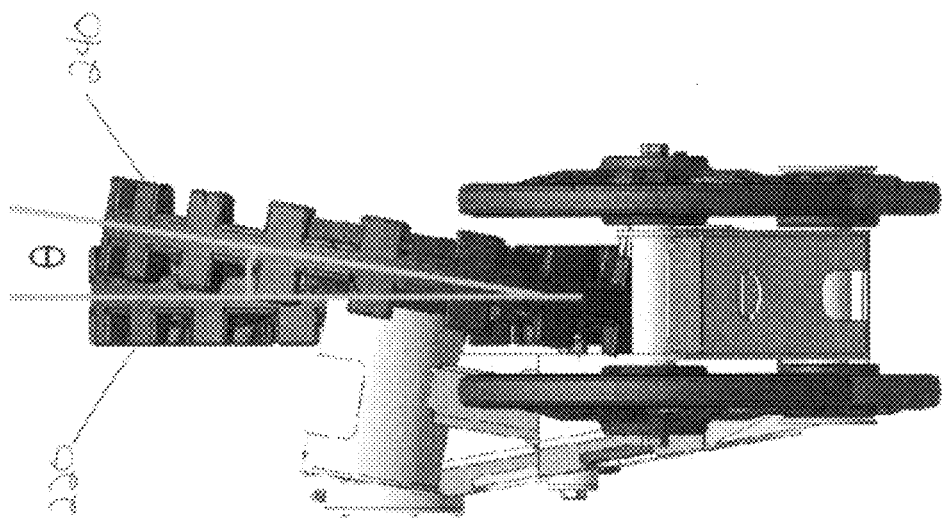
FIG. 6B is a rear view of a complete assembly showing two suspension means at rest and having a difference of Δy between the alignment of the sprockets.

Now referring to FIGS. 6A and 6B, the independent suspension traction system 200 allows the mobile drive sprocket 240 to pivot of a camber angle of θ. Also, the traction system 200 allows a lateral movement Δy between the fixed drive sprocket 220 and the mobile drive sprocket 240. The possible camber angle and lateral movement ensure that the endless traction band 260 stays in contact with the terrain at all time and substantially independently of the positions of the suspension.

In another embodiment, a unitary frame would replace the plurality of sections 212 and 213. In this embodiment, the tension adjustment system would also be replaced by pivoting idler wheels. The idler wheels, once pivoted in one direction, would release tension in the endless traction band 260. When pivoted in another direction, the idler wheel would correctly tension the endless traction band 260.

In another embodiment, the traction system, while being attached to two shaft axles of the vehicle 100 may be attached to one or no drive shaft. In such embodiment, one or more drive wheels 120 or 140, while being slidingly attached to two axle shafts, the vehicle 100, would remain tractably passive.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction system for a vehicle comprising:
   a) at least one fixed drive wheel, wherein said fixed drive wheel is attachable to a shaft of the vehicle;
   b) at least one mobile drive wheel, wherein said mobile drive wheel is attachable to a shaft of the vehicle;
   c) a main frame, wherein said frame comprises:
   i) a first circular aperture in which a rolling mechanism is installed;
   ii) a cavity comprising a plurality of second apertures to fix a pivotal member;
   d) a pivotal member, wherein said pivotal member is pivotally mounted:
   i) at a first extremity, to the at least one mobile drive wheel;
   ii) at the other extremity, to the cavity of the main frame allowing lateral movement in relation to the said cavity;
   e) at least one idler wheel pivotally mounted at each extremity of the main frame;
   f) a plurality of road wheels pivotally mounted to the main frame;
   g) a traction band installed around the drive wheels, the idler wheels and the road wheels;
   wherein the second apertures to fix the pivotal member are positioned on the frame to ensure that the mobile drive wheel applies a constant tension on the traction band during the pivotal movement of the mobile drive wheel induced by the variation of the angle between the pivotal member while pivoting around a rotation axis of said shaft.

2. A traction system as claimed in claim 1, wherein a distance between a centre of the aperture of the pivotal member and a centre of the cylindrical passage is relative to a diameter of the mobile drive wheel and to the position of the apertures such as to ensure that the tension applied on the traction band is constant.

3. A traction system as claimed in claim 1, wherein an initial angle between the pivotal member and the main frame is calculated to ensure that the tension from the traction band is applied on the main frame compare to the tension applied to the suspension elements of the vehicle.

4. A traction system as claimed in claim 1, wherein the at least one mobile drive wheel is a sprocket wheel.

5. A traction system as claimed in claim 1, wherein the at least one fixed drive wheel is a sprocket wheel.

6. A traction system as claimed in claim 1, wherein the at least one fixed drive wheel is attachable to a drive shaft of the vehicle.

7. A traction system as claimed in claim 6, wherein the at least one mobile drive wheel is attachable to a drive shaft of the vehicle.

8. A traction system as claimed in claim 1, wherein the frame comprises two frame sections, wherein:
   a) a first frame section comprises:
   i) an extension member;
   b) a second frame section that comprises:
   i) a passage or cavity;
   ii) at least one enclosure used to hold at least one tension retainer.

9. A traction system as claimed in claim 8, wherein the frame sections are slidingly moveable with respect to each other.

10. A traction system as claimed in claim 9, wherein a tension adjustment system allows the second frame section to slide away or toward the first frame section, causing the tension in the traction band to be increased or decreased.

11. A traction system as claimed in claim 8, wherein the at least one fixed drive wheel is attachable to a drive shaft of the vehicle.

12. A traction system as claimed in claim 11, wherein the at least one mobile drive wheel is attachable to a drive shaft of the vehicle.

* * * * *